United States Patent [19]

Srivastava et al.

[11] Patent Number: 5,788,883
[45] Date of Patent: Aug. 4, 1998

[54] DETERMINATION PROCESS FOR DETERMINING IF QUANTUM SPLITTING PHOSPHORS ARE OBTAINED AND NOVEL COMPOSITIONS

[75] Inventors: Alok Mani Srivastava, Schenectady, N.Y.; William Winder Beers, Chesterland, Ohio

[73] Assignee: General Electric Company, Schenectady, N.Y.

[21] Appl. No.: 808,705

[22] Filed: Feb. 28, 1997

Related U.S. Application Data

[63] Continuation of Ser. No. 624,281, Mar. 29, 1996, abandoned.

[51] Int. Cl.$^6$ ................................................ C09K 11/00
[52] U.S. Cl. ................................................ 252/301.4 R
[58] Field of Search ...................... 252/301.4 R, 301.4 H

[56] References Cited

U.S. PATENT DOCUMENTS

| | | | |
|---|---|---|---|
| 3,233,189 | 2/1966 | Guggenheim et al. | 252/301.4 H |
| 3,397,316 | 8/1968 | Brown et al. | 252/301.4 H |
| 4,150,321 | 4/1979 | Schetters et al. | 313/486 |
| 5,140,604 | 8/1992 | Alablanche et al. | 372/41 |

OTHER PUBLICATIONS

Chem. Ab. 111:47511; Verwey et al, "Ultraviolet luminsecence of $Pr^{+3}$ in a glass", J. Solid State Chem., vol. 80(1), pp. 152–156, 1989. no month.

Chem. Ab. 82:36905; Sommerdijk et al, "Luminescence of $Pr^{+3}$ ion activated fluorides", J. Lumin., vol. 9(4), pp. 288–296, 1974. no month.

Chem. Ab. 80:139008; Sommerdijk et al, "Two phonon luminescence with ultraviolet excitation of trivalent praseodymium", J. Lumin., vol. 8(4), pp. 341–343, 1974. no month.

Chem. Ab. 120:310252; Ganem et al, "Excited–state dynamics of $Pr^{3+}:LaCl_3$", J. Lumin., vol. 58(1–6), pp. 298–302, 1994. no month.

Chem. Ab. 123:96973; Merkle et al, "Spectroscopic study of $Pr:Ca_5(PO_4)_3F$ and $Pr:SrAl_{12}O_{19}$ as potential visible laser materials", OSA Proc. Adv. Solid–State Lasers, Proc. Top. Meet., ed. Fan et al, pp.361–366, 1994. no month.

*Primary Examiner*—Melissa Bonner
*Attorney, Agent, or Firm*—Ernest G. Cusick; Noreen C. Johnson

[57] ABSTRACT

Quantum splitting phosphors with host lattices activated by praseodymium +3 where covalency of the $Pr^{+3}$-ligand bond is maintained so that the center of gravity of the $Pr^{+3}$ 4f5d band level is located above the $^1S_0$ level and the host lattice has a band gap of greater than about 5 eV.

6 Claims, No Drawings

DETERMINATION PROCESS FOR DETERMINING IF QUANTUM SPLITTING PHOSPHORS ARE OBTAINED AND NOVEL COMPOSITIONS

This application is a Continuation of applcacation Ser. No. 08/624,281 filed Mar. 29, 1996 now abandoned.

The invention was first conceived or reduced to practice in the performance of work under a United States Government contract with NIST, having Government Contract Number 0670 NANB 3H1372. The Government may have certain rights to the invention.

FIELD OF THE INVENTION

This invention relates to a process for producing quantum splitting phosphors and novel compositions. More specifically, this invention relates to quantum splitting in a host lattice by activating the host with the praseodymium ion in the +3 state ($Pr^{+3}$). Even more specifically, this invention relates to rules for obtaining a quantum splitting phosphor.

BACKGROUND OF THE INVENTION

Quantum splitting is generally described as the conversion of a single ultraviolet photon into two visible photons with the result that the quantum efficiency of luminescence exceeds unity. Quantum splitting materials are desirable for use as phosphors in applications requiring light to be generated. A suitable quantum splitting material can in principle produce a significantly brighter light source.

Quantum splitting has been demonstrated previously in fluoride-base materials. A material comprising 0.1% $Pr^{+3}$ in a matrix of $YF_3$ has been shown to generate more than one visible photon for every absorbed ultraviolet (UV) photon when excited with 185 nm radiation. The measured quantum efficiency of this material was 145%±15%, and thus greatly exceeded unity.

The critical conditions that yield quantum splitting by the $Pr^{+3}$ ion have been achieved in fluoride-based materials. Recently, quantum splitting in oxide host lattices activated by $Pr^{+3}$ have been disclosed by applicants in an oxide material having the formula: $La_{1-x}Pr_xMgB_5O_{10}$, where $0<X\leq0.20$, U.S. patent application Ser. No. 08/367,634; now U.S. Pat. No. 5,552,082 and in an oxide material having the formula: $Sr_{1-x}Pr_xAl_{12-x}Mg_xO_{19}$, where $0<X\leq0.20$, U.S. patent application Ser. No. 08/367,637, now U.S. Pat. No. 5,571 451.

There is a need for a process to produce quantum splitting phosphors and novel compositions. There is also a need for a process to produce quantum splitting in a host lattice by activating the host with the praseodymium ion in the +3 state ($Pr^{+3}$). There is further a need for rules for obtaining a quantum splitting phosphor activated by $Pr^{+3}$.

SUMMARY OF THE INVENTION

This invention satisfies these needs by providing a process to make quantum splitting phosphors where a host lattice is activated by $Pr^{+3}$ comprising the steps of: incorporating the $Pr^{+3}$ in the host lattice so that the $Pr^{+3}$ energy position of its 4f5d band is located above a $^1S_0$ state; positioning the $Pr^{+3}$ 4f5d band and the $^1S_0$ state below the host lattice conduction band; and choosing a site symmetry of the host lattice for the $Pr^{+3}$ so that maximum quantum efficiency may be generated by the phosphor. Examples of host lattices may be oxides, such as aluminates or borates. Other oxide hosts that incorporate praseodymium in the +3 state in the lattice structure and meet the above-mentioned conditions, are also contemplated as quantum splitting phosphors. A further example of a host lattice may be the fluoride hosts that also meet the above-mentioned rules for the $Pr^{+3}$ ion. Still a further example of a host lattice is a mixture of oxides and halides, such as an oxyhalide host lattice.

Another aspect of this invention is quantum splitting phosphors having host lattices activated by the $Pr^{+3}$ ion where covalency of the $Pr^{+3}$-ligand bond is maintained so that the center of gravity (bary center) of the $Pr^{+3}$ 4f5d band level is located above the $^1S_0$ level and the host lattice has a band gap of greater than about 5 eV.

Still another aspect of this invention includes specific compositions of quantum splitting phosphors having oxide host lattices activated by the $Pr^{+3}$ ion where the $Pr^{+3}$ to oxygen bond distance must exceed about 2.561 angstroms (Å) for quantum splitting to occur.

Yet another aspect of this invention includes compositions of quantum splitting phosphors having fluoride host lattices activated by the $Pr^{+3}$ ion where the $Pr^{+3}$ to fluoride bond distance must exceed about 2.28 Å.

Other benefits of this invention may be apprehended by reviewing the description and appended claims.

DESCRIPTION OF THE INVENTION

This invention relates generally to new quantum splitting phosphors with $Pr^{+3}$ as the activator in a host lattice. The quantum splitting phosphors can be developed if certain rules are followed. The rules for obtaining a successful quantum splitting phosphor activated by $Pr^{+3}$ are: the $Pr^{+3}$ energy band, 4f5d, must be located above the $^1S_0$ state; the band gap of the host lattice should be high so that the $Pr^{+3}$ energy band 4f5d and the $^1S_0$ state are located below the host lattice conduction band; and quantum splitting phosphors will be generated provided that the correct site symmetry is offered by the host lattice for the $Pr^{+3}$ ion. For instance, it has been found that the site symmetry of $y^{+3}$ in $YF_3$ appears appropriate for generating high quantum efficiency.

The first requirement for quantum splitting from the $Pr^{+3}$ ion incorporated in a solid is that the 4f5d level is located above the $^1S_0$ state. Quantum splitting of the incident high energy photon will not occur if the energy position of the 4f5d band is below that of the $^1S_0$ state. Thus, the location of the 4f5d state depends critically on the strength of the crystal field acting on the $Pr^{+3}$ ion. A weak crystal field results in a high energy position of the 4f5d level. Since the strength of the crystal field decreases with increasing $Pr^{+3}$ ion to anion distance, quantum splitting will be favored in structures which offer high coordination number for the $Pr^{+3}$ ion. To demonstrate, quantum splitting is observed in $SrAl_{12}O_{19}$ where the $Pr^{+3}$ ion is coordinated to nine nearest neighbor oxygen ions.

As a result of the crystalline field effect on the energy position of the 4f5d level for $Pr^{+3}$ ion, the additional effects of bond covalency should also be taken into account. In highly covalent bond surroundings, the center of gravity or bary center of the $Pr^{+3}$ ion 4f5d level is located at lower energies. Thus, it is necessary to maintain low covalency of the $Pr^{+3}$ -ligand bond.

Successful quantum splitting also requires that the $Pr^{+3}$ ion 4f5d band and the $^1S_0$ state are located below the conduction band of the solid and not within the solid's conduction band. Photoionization of the $Pr^{+3}$ ion is possible when its 4f5d level is located within the conduction band of the solid and this may not result in the generation of more than one photon for every absorbed photon. Therefore, it has been discovered that the $Pr^{+3}$ ion must be incorporated in a lattice which has a band gap greater than about 5 electron volts (eV).

The observation of quantum splitting does not necessarily mean a quantum efficiency exceeding unity. For generating high quantum efficiency it is necessary that the proper site symmetry be chosen to maximize the correct transition probabilities. For instance, it has also been discovered that the site symmetry offered by the $YF_3$ host is ideal for generating high quantum efficiency of luminescence.

Other characteristics and advantages of the present invention will become more evident from the following examples, which are in no way to be considered as constituting a limitation on the invention.

EXAMPLES

To illustrate the invention, using the rules given above, the average $Pr^{+3}$ to ligand bond distance in oxide and fluoride hosts has been calculated. The data in Table 1 shows that for various oxide hosts, the $Pr^{+3}$ ion to oxygen bond distance must exceed about 2.561 Å for quantum splitting to occur.

TABLE 1

| | Average $Pr^{+3}$ To Oxygen Bond Distances And Prediction Of Quantum Splitting | | |
|---|---|---|---|
| EXAMPLE | COMPOUND | BOND DISTANCE | QUANTUM SPLITTING |
| 1 | $YPO_4$ | 2.241Å | NO |
| 2 | $YBO_3$ | 2.383Å | NO |
| 3 | $LaPO_4$ | 2.561Å | NO |
| 4 | $LaMgB_5O_{10}$ | 2.611Å | YES |
| 5 | $LaB_3O_6$ | 2.616Å | YES |
| 6 | $SrAl_{12}O_{19}$ | 2.756Å | YES |

It is shown by the above data in Table 1 that based on the average $Pr^{+3}$ to oxygen ligand bond distance, it can successfully be predicted if the host lattice will support quantum splitting. It is further noted that the above oxide host lattices are for demonstration and do not limit the process of this invention to only the above-mentioned oxides. Rather, any host lattice, or mixtures of host lattices, activated by $Pr^{+3}$ ion that meet the rules of the invention will exhibit quantum splitting phosphors. For instance, it is contemplated that mixtures of oxides and halides, such as oxyhalides, can serve as host lattices. An example of an oxyhalide would be LaOCl.

Quantum splitting also requires that the $Pr^{+3}$ ion 4f5d state is located at energies below the conduction band of the solid host lattice so that photoionization of the $Pr^{+3}$ ion which decreases the luminescence efficiency is not possible. The $Pr^{+3}$ ion needs to be incorporated into a host lattice which has a band gap greater than about 5 eV.

Table 2 demonstrates the average $Pr^{+3}$ to halide bond distances and the prediction of quantum splitting for bond distances greater than about 2.280Å.

TABLE 2

| | Average $Pr^{+3}$ To Halide Bond Distances And Prediction Of Quantum Splitting | | |
|---|---|---|---|
| EXAMPLE | COMPOUND | BOND DISTANCE | QUANTUM SPLITTING |
| 7 | $LiYF_4$ | 2.265Å | NO |
| 8 | $YF_3$ | 2.321Å | YES |
| 9 | $LaF_3$ | 2.364Å | YES |
| 10 | $NaYF_4$ | 2.364Å | YES |
| 11 | $LaCl_3$ | 2.980Å | YES |

Variations and modifications will be obvious to one skilled in the art and the claims are intended to cover all modifications and variations that fall within the true spirit and scope of the invention.

What is claimed:

1. A determination process for determining if quantum splitting phosphors are obtained where a host lattice is activated by $Pr^{+3}$, the process comprising the steps of:

determining if the $Pr^{+3}$ is incorporated in the host having an effective coordination number for the $Pr^{+3}$ ion so that the $Pr^{+3}$ energy position of its 4f5d band is located above a $^1S_0$ state;

determining if the $Pr^{+3}$ 4f5d band and the $^1S_0$ state are positioned below the host lattice conduction band where $Pr^{+3}$ is incorporated in a lattice having a band gap greater than about 5 electron volts; and determining if a site symmetry of the host lattice for the $Pr^{+3}$ has been chosen having an effective crystal field strength and an effective $Pr^{+3}$ to host lattice bond distance;

wherein if the $Pr^{+3}$ is incorporated in the host having an effective coordination number for the $Pr^{+3}$ ion so that the $Pr^{+3}$ energy position of its 4f5d band is located above a $^1S_0$ state, the $Pr^{+3}$ 4f5d band and the $^1S_0$ state are positioned below the host lattice conduction band, and the site symmetry of the host lattice for the $Pr^{+3}$ has been chosen having an effective crystal field strength and an effective $Pr^{+3}$ to host lattice bond distance a quantum splitting phosphor is obtained.

2. A process according to claim 1 where the host lattice is an oxide host lattice or a halide host lattice or a oxyhalide host lattice.

3. A process according to claim 2 where the oxide host lattice has an average $Pr^{+3}$ to oxygen bond distance greater than about 2.561 Å.

4. A process according to claim 3 where the oxide host lattice having the average $Pr^{+3}$ to oxygen bond distance greater than about 2.561Å is selected from the group consisting of $SrAl_{12}O_{19}$, $LaMgB_5O_{10}$, $LaB_3O_6$, and mixtures thereof.

5. A process according to claim 2 where the halide host lattice has an average $Pr^{+3}$ to halide bond distance greater than about 2.28 Å.

6. A process according to claim 1 where the site symmetry of the host lattice for the $Pr^{+3}$ is chosen so maximum quantum efficiency may be generated by the phosphor.

* * * * *